United States Patent [19]
Watanabe

[15] 3,645,499
[45] Feb. 29, 1972

[54] VALVE STRUCTURE
[72] Inventor: Shunso F. Watanabe, Livonia, Mich.
[73] Assignee: Kelsey-Hayes Company
[22] Filed: Mar. 23, 1970
[21] Appl. No.: 21,759

[52] U.S. Cl. ........................................................... 251/303
[51] Int. Cl. ........................................................... F16k 1/16
[58] Field of Search .................... 251/303, 335, 228, 40, 57, 251/367

[56] References Cited

UNITED STATES PATENTS

| 2,969,926 | 1/1961 | Peeps | 251/228 X |
| 3,117,761 | 1/1964 | Billeter | 251/57 |
| 3,276,738 | 10/1966 | Downhill | 251/228 X |
| 3,279,742 | 10/1966 | Billeter | 251/40 |
| 3,339,881 | 9/1967 | Palmer | 251/335 X |
| 3,384,122 | 5/1968 | Harpman | 251/367 X |
| 3,457,953 | 7/1969 | Warncke et al. | 251/303 X |
| 3,490,487 | 1/1970 | Deloire | 251/303 X |

Primary Examiner—Henry T. Klinksiek
Attorney—Harness, Dickey & Pierce

[57] ABSTRACT

A flow control device comprising a housing formed with a valve chamber including a seat on which a tiltable valve is adapted to be disposed in sealing engagement therewith. A controlled opening of the valve is achieved by an actuator operatively connected to the stem portion of the valve so as to effect a tilting of the head portion thereof relative to the valve seat. The design of the individual components comprising the valve assembly enables their fabrication from plastic materials by modern molding techniques providing a precision valve assembly at a fraction of the cost of similar type valves heretofore known.

8 Claims, 6 Drawing Figures

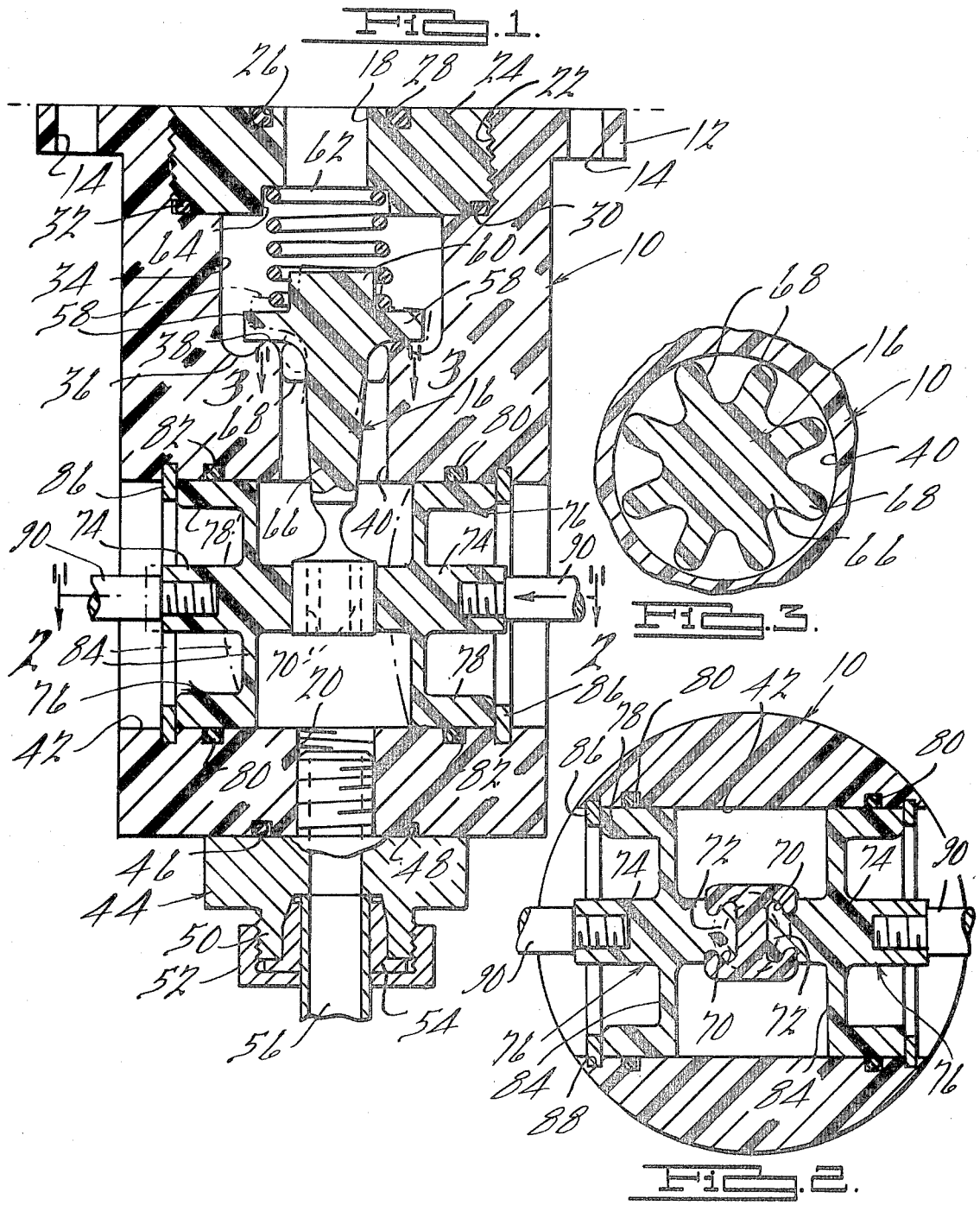

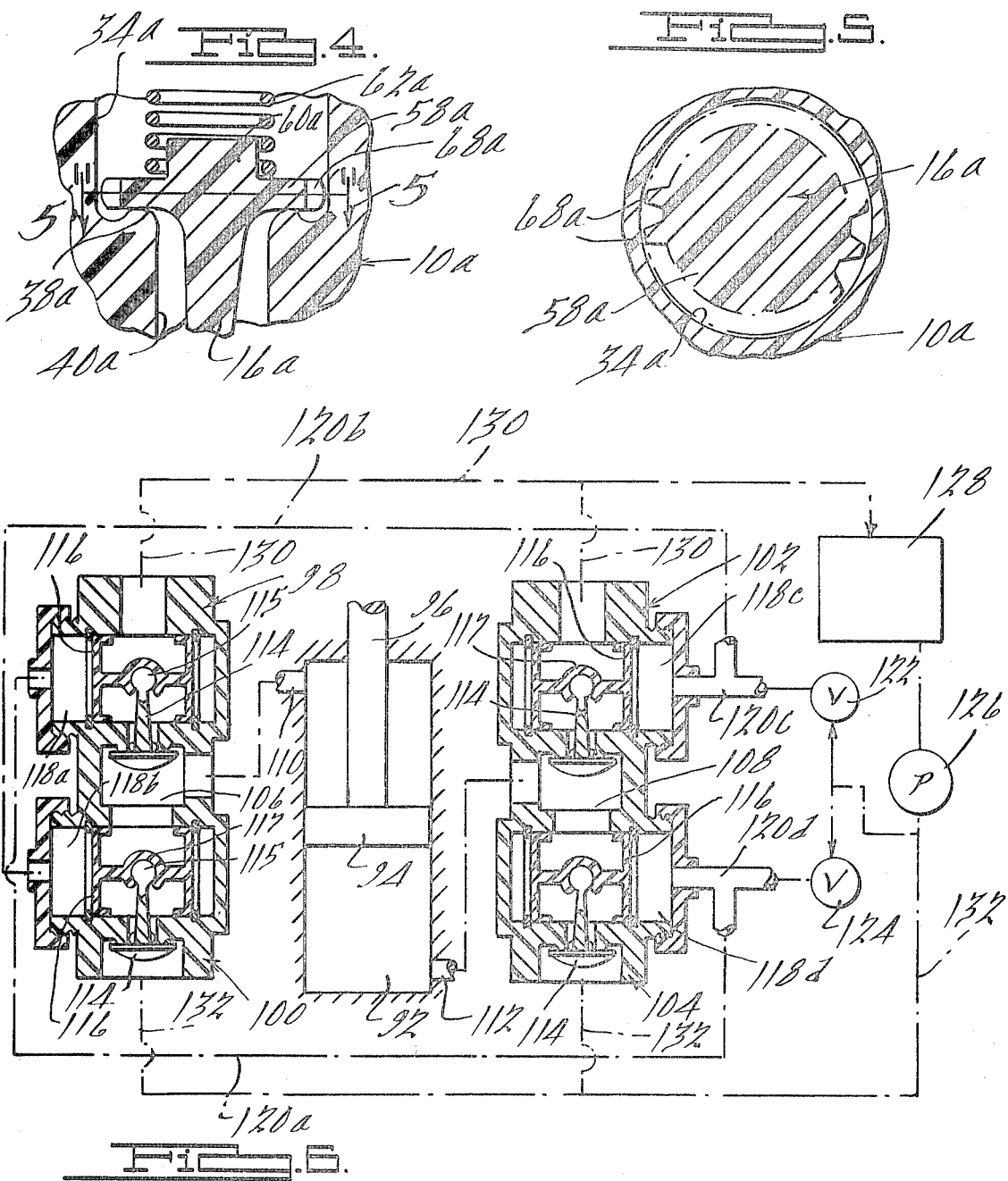

VALVE STRUCTURE

SUMMARY OF THE INVENTION

The advantages and benefits of the present invention are achieved by a flow control device which comprises a housing formed with an internal chamber which is disposed in communication with an inlet port and an outlet port provided in the walls of the housing. The housing, at a point intermediate of the inlet and outlet ports, is formed with a shoulder defining a valve port and a valve seat on which a tiltable valve is adapted to be disposed. The valve comprises an enlarged head portion which, in the normal closed position of the valve, overlies the valve port and is disposed in sealing engagement with the valve seat. The valve further includes an elongated stem affixed to and extending axially of the head portion of the valve through the valve port and is formed with means for operatively connecting an actuator thereto so as to effect an angular tilting of the valve relative to the valve seat. The valve is formed with appropriate guide means for maintaining the valve appropriately centered relative to the valve seat while enabling angular tilting movement of the valve between the closed position and an open position angularly spaced therefrom. Biasing means are provided for continuously urging the valve toward the closed position.

In addition to providing a durable precision-type flow control valve at economical cost, the structure of the valve assembly further provides for extreme versatility in coupling a plurality of such units to each other, forming a combination assembly suitable for use in a wide variety of servo systems. The use of sealed flexible diaphragms for transmitting the actuating force to the valve stem enables the valve to be readily adapted to fluid as well as mechanical actuating systems.

Other benefits and advantages of the present invention will become apparent upon a reading of the description of the preferred embodiments taken in conjunction with the accompanying drawings.

BRIEF DESCRIPTION OF THE DRAWINGS

FIG. 1 is a longitudinal vertical sectional view through an assembled flow control valve constructed in accordance with one of the embodiments of the present invention;

FIG. 2 is a transverse horizontal sectional view through the actuating device of the flow valve shown in FIG. 1 and taken substantially along the line 2—2 thereof;

FIG. 3 is an enlarged transverse sectional view of the tiltable valve shown in FIG. 1 and taken substantially along the line 3—3 thereof;

FIG. 4 is a fragmentary longitudinal sectional view of an alternative satisfactory embodiment of a tiltable valve;

FIG. 5 is a transverse vertical sectional view through the tiltable valve shown in FIG. 4 as viewed substantially along the line 5—5 thereof; and FIG. 6 is a typical arrangement shown partly in section and partly schematic of four valve assemblies connected in a manner so as to control a double-acting fluid-actuated cylinder.

DESCRIPTION OF THE PREFERRED EMBODIMENTS

Referring now in detail to the drawings, and as may be best seen in FIGS. 1-3, a flow control device is shown comprising a housing 10 which is of a substantially circular cylindrical configuration and is formed with a mounting flange 12 at one end thereof for securing the housing to a suitable manifold or the like by means of screws adapted to extend through apertures 14 in the mounting flange. The housing 10 is formed with a chamber of variable diameter extending substantially axially thereof within which a tiltable valve 16 is mounted for controlling the flow of a fluid from an inlet port 18 at one end of the housing to an outlet port 20 formed in the opposite end thereof.

The axially extending chamber through the housing is comprised of an enlarged threaded bore 22 at the upper end of the housing, as viewed in FIG. 1, in which a threaded plug 24 is threadably engaged and is formed centrally thereof with the aperture defining the inlet port 18. The outer face of the plug 24 is formed with an annular groove 26 and circling the inlet port 18 in which an O-ring type seal is adapted to be positioned for forming a fluidtight connection when the valve assembly is fastened on a mounting surface. The inner peripheral corner of the plug 24 is provided with a recess 30 in which an O-ring type seal 32 is adapted to be positioned for forming a fluidtight seal between the plug and the valve housing.

The axial chamber adjacent to the threaded bore 22 is formed with a circular bore 34 of reduced diameter terminating at its lower end, as viewed in FIG. 1, with a shoulder 36 of an S-shaped cross section, the projecting portion of which defines an annular valve seat 38. The valve seat 38 is disposed in encircling relationship and substantially concentric to a valve port as defined by a circular bore 40 having its upper end disposed in communication with the bore 34 and the lower end thereof with an actuating chamber as defined by a transverse circular bore 42.

The central portion of the chamber as defined by the transverse bore 42 is disposed at its lower portion, as viewed in FIG. 1, in communication with the threaded outlet port 20. The outlet port as shown may suitably be connected to a male fitting 44 having a radially extending flange adapted to overlie a portion of the exterior surface of the housing surrounding the outlet port and forming a fluidtight seal in cooperation with an O-ring seal 46 disposed in an annular groove 48. The outer end portion of the fitting 44 is provided with a threaded sleeve 50 for receiving a threaded cap 52 for securing a compression-type fitting 54 around the end of a tube 56 disposed in communication with the outlet port 20. It will be appreciated that alternative well-known connectors can be employed for connecting the outlet port of the valve assembly to a conduit or manifold as may be desired.

The tiltable valve 16 is comprised of an enlarged head portion including an annular flange 58, the lower surface of which, as viewed in FIG. 1, is adapted to be disposed in sealing engagement against the annular seat 38 when the valve is in the normally closed position as shown in solid lines. A cylindrical post 60 projects upwardly of the annular flange 58 for guidably receiving and retaining a compression-type coil spring 62 having its lower end seated against the upper surface of the annular flange 58 and the upper end thereof seated in an annular recess 64 formed in the threaded plug 24. An elongated stem portion 66 is integrally affixed to and extends axially of the enlarged head portion of the tiltable valve through the valve port as defined by the circular bore 40 to a position centrally of the transverse bore 42. The tiltable valve is formed with a plurality of radially extending fins 68, as best seen in FIGS. 1 and 3, which are formed with arcuately contoured radial surfaces that are adapted to slidably contact the housing within the valve port so as to guidably position the valve centrally of the valve seat when in the normally closed position, as well as during angular tilting movement of the valve to an open position spaced angularly therefrom.

The lower end of the stem portion 66, as best seen in FIGS. 1 and 2 of the drawing, is formed with a pair of opposed dovetail-shaped slots 70 which are adapted to be slidably interlocked with correspondingly contoured engaging prongs 72 formed on the inner ends of posts 74 of diaphragm members 76. Each diaphragm member 76, as shown in FIGS. 1 and 2, is comprised of a cylindrical flange 78 which is slidably disposed within the transverse bore 42 and is sealed by means of an O-ring sealing member 80 positioned in an encircling groove 82 formed in the housing 10. The cylindrical flange 78 is connected to the axially extending posts 74 of the diaphragm member by means of a circular flexible diaphragm 84, permitting transverse movement of the post members relative to the longitudinal axis of the housing in response to flexure of the diaphragm from a normally unflexed condition, as shown in solid lines in FIG. 1, to a flexed position, as shown in phantom. Retention of each diaphragm member in appropriate position within the transverse bore 42 is achieved by a snap-type retainer ring 86 seated within a circumferentially extending groove 88. As shown in FIG. 1, the outer edge portion of the cylindrical flange 78 is adapted to abut the inner surface of the retainer ring 86, preventing relative axial movement of the member in the transverse bore.

In the specific embodiments illustrated in FIGS. 1 and 2, transverse reciprocation of the posts of the diaphragm members 76 is achieved by mechanically interlocked actuator rods 90 which have the end portions thereof threadably engaged in correspondingly threaded apertures extending axially inwardly of the outer ends of the posts. The transverse displacement of the actuator rods 90 is transmitted to the end of the stem of the tiltable valve 16, effecting a tilting thereof from the normally closed position, as shown in solid lines in FIG. 1, to a tilted open position, as shown in phantom, in which a portion of the enlarged head portion thereof is out of sealing engagement with the valve seat 38. Flexing of the stem to facilitate angular tilting of the valve in response to transverse reciprocation of the posts on the diaphragm members is provided by a reduced section 91 formed in the stem adjacent to its end.

An alternative satisfactory embodiment of guide means from that shown in FIGS. 1 and 3 is illustrated in FIGS. 4 and 5 for maintaining the tiltable valve centrally located relative to the valve seat, while further enabling tilting thereof from the normally closed position. As shown in FIGS. 4 and 5, the tiltable valve 16a is similarly formed with an annular flange 58a which is of an enlarged diameter enabling the provision of a series of circumferentially spaced radially projecting fins 68a which are adapted to be disposed in coacting guiding sliding relationship with the inner surface of the bore 34a through the housing 10a. The tiltable valve 16a similarly is provided with a cylindrical post 60a for maintaining a compression-type coil spring 62a in appropriate centralized position thereon so as to continuously urge the valve into seating engagement with the annular valve seat 38a.

It will be apparent from the arrangement as hereinbefore set forth that the flow of fluid through the valve chamber of the valve assembly from the inlet port 18 out through the outlet port 20 is controlled by the tilted disposition of the tiltable valve 16 which in turn is a function of the transverse position of the actuators connected to the end portion of the valve stem. The coil spring 62 continuously urges the tiltable valve to a position in which the valve stem thereof is disposed in axial alignment with the valve port such that the flange 58 is disposed in sealing engagement with the valve seat 38. The sealing pressure provided by the coil spring 62 is further augmented by the pressure applied to the upper surfaces of the enlarged head portion of the tiltable valve urging it into firm sealing engagement with the valve seat. The degree of angular inclination of the valve stem, effecting a rocking or tilting of the valve head off the seat, serves to control the degree of valve opening and correspondingly the quantity of fluid flow through the valve chamber.

It will also be apparent from the construction of the specific components comprising the improved valve assembly that these components can readily be fabricated from a variety of thermoplastic and thermosetting-type plastic materials employing modern molding techniques such as injection molding, whereby components of precise configuration and dimensional control are attained. Only minimal machining, if any, is required to remove any flash from the molded components or to impart desired grooves where desired or necessary in the event sectionalized molds and cores are not employed. Among various plastic materials which have been found particularly suitable are vinyl-type resins and polyolefin-type resins, of which polyethylene constitutes a preferred material in view of its strength, resistance to most fluids, flexibility, cost, ease of fabrication and durability in use.

In accordance with the construction of the flow control valve as shown in FIGS. 1-3, an assembly thereof can readily be achieved by first installing the diaphragm members 76 in the transverse bore 42 of the housing and sealing and interlocking them therein by means of the O-ring seals 80 and retaining rings 86. Thereafter, the tiltable valve 16 is inserted axially into the chamber until the head portion thereof is seated on the valve seat and the dovetailed slots at the end of the stem portion thereof is interlocked with the engaging prongs on the diaphragm members. The compression coil spring 62 is then placed in appropriate position on the head portion and the threaded plug 24 is thereafter turned inwardly until its outer face is flush with the flange face on the housing and the O-ring seal 32 is seated in mutual sealing engagement therebetween. The attachment of fittings and actuators to the valve thereafter can be accomplished in accordance with the desired installation.

An example of employing a plurality of such valve assemblies in a system to control the operation of a fluid motor, such as a double-acting fluid-actuated cylinder 92, is diagrammatically illustrated in FIG. 6. The cylinder 92 includes a piston 94 and a piston rod 96 which is adapted to be connected to a suitable device to be actuated. In the arrangement illustrated, four individual valve assemblies are employed which are mounted in pairs and are designated as 98, 100 and 102, 104, respectively. Each pair is formed with a central chamber 106 and 108, respectively, which may be formed by securing two individual valve assemblies together or by forming a housing provided with two valve seats and valve ports. Chamber 106 is connected by conduit 110 to the piston rod end of the fluid-actuated cylinder and conduit 112 connects chamber 108 to the blank end of the cylinder. Each of the individual valves 98-104 is provided with a tiltable valve 114 similar to the tiltable valve 16 previously described which in a like manner has the stem end portion thereof connected to diaphragm members 116. In the schematic arrangement illustrated, each stem is formed with a ball 115 which is adapted to snap into locking pivoting engagement with a socket 117 on the post extending between the diaphragms.

In the specific embodiment illustrated, flexing of the diaphragms of the members 116 is not achieved by a mechanical linkage, such as the actuator rods 90 shown in FIG. 1, but instead by the application of a fluid control pressure to enclosed chambers 118a, 118b, 118c and 118d, respectively. Each of the foregoing control chambers is connected to a conduit 120a, 120b, 120c and 120d, respectively, which in turn is controlled by control valves 122 and 124. The inlet sides of control valves 122 and 124 are connected to the output side of a pressure supply pump 126, which is connected to a reservoir tank 128. Control valves 122 and 124 are adapted to open alternatively so that the control fluid will be transmitted to only two control chambers, thereby operating only two valves to provide a concurrent venting of one end of the cylinder and the application of pressure to the opposite end thereof.

As shown in FIG. 6, control valve 122 is connected to conduits 120b and 120c for operating individual valve assemblies 100 and 102, respectively, while control valve 124 is connected to conduits 120a and 120d for operating individual valves 98 and 104, respectively. Individual valves 98 and 102 are provided with outlet ports which are connected to return conduit 130 for returning hydraulic fluid back to the reservoir 128, while valves 100 and 104 are formed with inlet ports connected to a pressure supply conduit 132 connected to the output side of the supply pump 126.

In operation and in response to an opening of control valve 122, fluid pressure is supplied through control conduits 120b and 120c to control chambers 118b of valve 100 and 118c of valve 102, effecting a flexing of the corresponding diaphragm members and a tilting and opening of tiltable valves 114. The opening of valve 100 permits pressurized fluid supplied through conduit 132 to enter central chamber 106 which thereafter passes through conduit 110 into the rod end of the double-acting fluid-actuated cylinder 92 causing the piston 94 to move downwardly as viewed in FIG. 6. Simultaneously, the opening of valve 102 permits fluid in the blank end of the cylinder 92 to be vented or bled out of conduit 112 into the central chamber 108 and then out through return conduit 130 back to the reservoir 128. An actuation of control valve 124 provides for a similar operating sequence involving valves 98 and 104 and wherein the piston 94 is moved in a direction opposite to that previously described.

While it will be apparent that the embodiments of the invention herein defined are well calculated to fulfill the objects set forth herein, it will be appreciated that the invention is susceptible to modification, variation and change without departing from the spirit thereof.

What is claimed is:

1. A flow-control device comprising, in combination, a housing having an internal chamber disposed in communication with an inlet port and an outlet port, said housing formed with a shoulder projecting inwardly of said chamber defining a valve port disposed intermediate of said inlet and said outlet ports, said housing formed with a valve seat encircling said valve port, a tiltable valve disposed in said chamber including an enlarged head portion overlying said valve port and disposed in sealing engagement with said valve seat when in a closed position and an elongated stem portion affixed to and extending axially of said head portion through said valve port, coacting guide means on said valve and said housing for mounting said valve for tilting movement relative to the axis of said valve port, biasing means for continuously urging said valve toward said closed position, said housing formed with a transverse bore disposed in communication with said internal chamber, a diaphragm sealingly disposed in said transverse bore and formed with an engaging member on the inner portion thereof, interlocking engaging means on the end portion of said stem portion and on said engaging member for removably coupling said stem portion to said diaphragm in response to axial movement of said valve into seated engagement with said valve seat, said diaphragm adapted to flex transversely of the axis of said stem portion for effecting an angular tilting movement of said valve from said closed position.

2. The flow-control device as defined in claim 1, wherein said biasing means comprises a coil spring seated against said head portion of said valve for biasing said valve axially toward said valve seat.

3. The flow-control device as defined in claim 1, wherein said head portion of said valve is formed with mounting means thereon for removably receiving a coil spring comprising said biasing means which is seated thereagainst to continuously urge said valve axially toward said valve seat.

4. The flow-control device as defined in claim 1, wherein flexure of said diaphragm is achieved in response to movement of an actuator rod affixed thereto.

5. The flow-control device as defined in claim 1, wherein flexure of said diaphragm is achieved in response to fluid pressure applied to the exterior surface thereof.

6. The flow-control device as defined in claim 1, wherein said coacting guide means on said valve comprises a plurality of radially projecting circumferentially spaced projections on said stem portion adjacent said head portion disposed with the ends thereof in abutting contact against the wall of the housing defining said valve port.

7. The flow-control device defined in claim 1, wherein said coacting guide means on said valve comprises a plurality of radially extending circumferentially spaced projections on said head portion with the outer ends thereof adapted to guidably contact the surface of said housing defining said internal chamber to maintain said valve in appropriate centralized disposition relative to said valve seat.

8. The flow-control device as defined in claim 1, wherein said stem portion is formed so as to permit deflection thereof in response to the application of force to the end portion by said diaphragm.

* * * * *